May 7, 1963  C. M. L. L. BOURCIER DE CARBON  3,088,556
SHOCK ABSORBERS
Original Filed Dec. 9, 1957
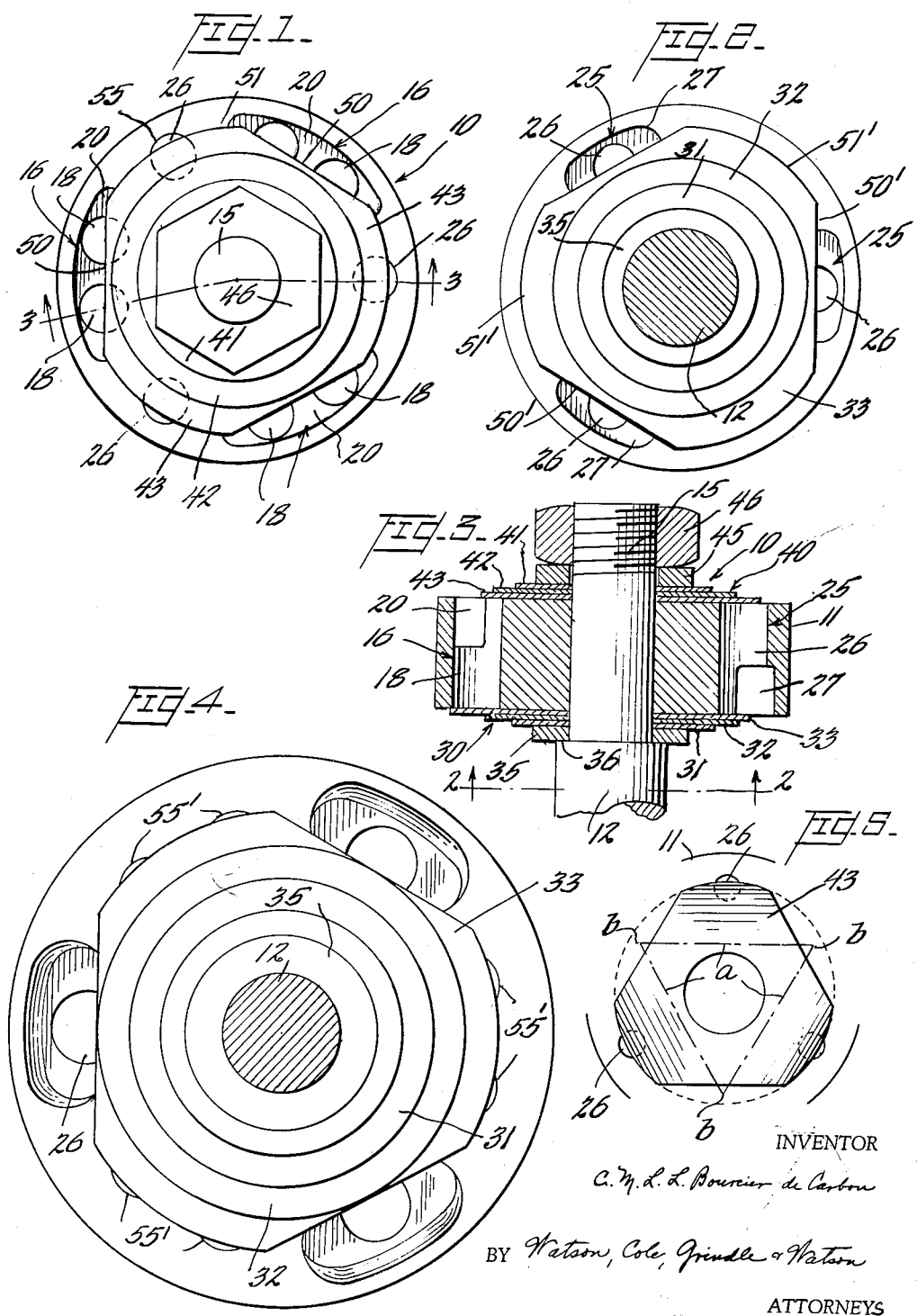

United States Patent Office 3,088,556
Patented May 7, 1963

3,088,556
SHOCK ABSORBERS
Christian Marie Lucien Louis Bourcier de Carbon,
64 Blvd. Maurice Barres, Neuilly-sur-Seine, France
Original application Dec. 9, 1957, Ser. No. 701,585, now
Patent No. 3,003,594, dated Oct. 10, 1961. Divided
and this application Feb. 20, 1961, Ser. No. 90,466
Claims priority, application France Nov. 4, 1957
2 Claims. (Cl. 188—88)

This invention relates to shock absorbers and more particularly to direct acting shock absorbers employing relatively reciprocating cylinders and pistons, whether of the hydraulic type or the pressurized hydraulic-pneumatic type. While not strictly limited thereto except as may be specified, the invention is particularly adapted for use in shock absorbers employed in connection with the spring suspensions of automotive vehicles.

This application is a division of my co-pending application Serial No. 701,585, filed December 9, 1957, now Patent No. 3,003,594, granted October 10, 1961; and thus has for its broad objects and purposes, the general purposes of that parent application in providing a progressively acting valve system for shock absorbers. Specifically, this particular subject matter embraces the features disclosed in the figure of drawings of that earlier case designated FIGURE 9 and subsequently cancelled.

Thus, the present concept has to do with the principle of cylindrical flexure of the thin flexible valve discs employed in the piston valving of the shock absorber to resiliently yieldably control the passage of damping fluid from one side of the piston to the other during the respective compression and rebound strokes thereof, this kind of progressive flexure not only improving the action of the shock absorber, but also reducing the fatigue to which the discs are subjected during use and also equalizing and distributing the directional effect of any anisotropism of the material of which the discs are made.

Whereas the general principle of cylindrical flexure has heretofore been applied most frequently by the applicant and his associates and licensees to shock absorber valving employing purely circular valve discs, since the latter are most suitable for application to existing designs and are possibly easier and less expensive to make, there are certain important advantages to the clipped or triangulated valve discs forming the subject of the present application which could in many cases outweigh the advantages of maintaining the discs in circular configuration.

First of all, there is provided reduced restriction to the inlet openings of those passageways through the piston which are on the same side of the piston as the given valve disc but which are not controlled thereby. This is of some importance in connection with motor vehicle shock absorbers under conditions of very sudden high velocity movements such as encountered when passing over tar strips on paved highways or on so-called washboard roads.

Then, too, the present arrangement affords very adequate fluid entry in the case of the pistons of shock absorbers of smaller diameters; very large valve discs of this type can be used on relatively small pistons.

The substitution of the novel triangulated valve discs for the conventional circular ones will give rise to no change in valve tension; any given valve setting will produce the same resistance curve whether the primary valve disc is triangulated or not.

The novel triangulated valve disc permits the extension of the rim of the piston axially, if desired, to obtain additional guiding length and a more effective piston-cylinder sealing.

The selection of retaining washer diameters is subject to wider variations in the case of the triangulated disc valves, since the three lines of initial perceptible flexure described in the application referred to, will very easily be prevented from intersecting within the area of the clipped disc and thus the highly important feature of cylindrical flexure will be preserved.

Also, in the present development in which the discs preferably seat against the relatively flat surfaces of the piston, the clipping of the discs results in a reduced tendency for entrapment of dust beneath the valve elements.

Other objects and features of novelty will be apparent from the following specification when read in connection with the accompanying drawings in which certain embodiments of the invention are illustrated by way of example.

In the drawings:

FIGURE 1 is a plan view of the compression face of a shock absorber piston embodying the principles of the invention;

FIGURE 2 is a horizontal sectional view through the piston rod as taken on line 2—2 of FIGURE 3 looking in the direction of the arrows, and thus presents a plan view of the rebound face of the piston;

FIGURE 3 is a vertical sectional view of the piston, the rod being shown in fragmentary style in elevation;

FIGURE 4 is a view similar to FIGURE 2 of a piston exemplifying a modification of the inventive concept; and FIGURE 5 is a diagram showing the general configuration and arrangement of the novel valve disc forming the essential feature of the invention.

In FIGURES 1, 2 and 3 of the drawings, the novel piston and rod assembly is indicated by the general reference numeral 10, the piston being indicated at 11 and the rod at 12. The piston is of generally cylindrical configuration and has an axial opening 13 to receive the attenuated upper end portion 15 of the piston rod 12. Of course, the lower end of the piston rod 12 is positioned to pass through a packed opening in the lower end of the shock absorber cylinder as applied to the particular line of shock absorbers originated by the present applicant. On the other hand, within the broad aspects of the present invention, the novel disc valving can be applied to shock absorbers of reversed construction in which the piston extends through an upper end of the cylinder.

In this embodiment of the invention, there are provided three sets of twinned compression passageways indicated generally at 16 and comprising adjacent cylindrical or tubular passageways 18, which separately debouch upon the underside of the piston, and the substantially kidney-shaped common entrance orifice or cavity 20. These sets of passageways are positioned 120° apart around the piston.

Intervening between the respective compression passageway groups 16 are the three shock absorber extension or rebound passageways 25 each of which comprises a cylindrical controlled outlet portion 26 and a flared approximately oval or kidney-shaped inlet extension designated 27.

Controlling the outlet orifices of the compression passageways 16 is the disc valve installation designated generally by the reference numeral 30 and comprising a series of stepped valve discs 31, 32, and 33 of progressively increasing diameters, the valve disc 33 being the primary controlling disc which yields under pressure of the fluid ahead of the piston upon the compression stroke to control the exit of fluid from the orifice of the compression passageways 18.

A preferably circular retaining washer 35 is seated upon the shoulder 36 between the piston rod portions 12 and 15, to firmly grip the central or axial portions of the valving 30.

Upon the upper end of the piston and disposed for the control of the outlet orifices of the rebound passageways 25 is the pack of valve discs 40 comprising stepped discs 41, 42, and 43 of progressive diameters, the disc 43 being the primary disc disposed directly over these orifices.

A retaining washer 45 serves to clamp the central portions of the valving 40 in place once the nut 46 is screwed down upon the threaded end of the piston portion 15.

It may be noted in passing that in the embodiment shown in FIGURES 1, 2 and 3 of the drawings, the kidney-shaped inlet cavities 20 of the paired passageways 18, forming the installation 16, are substantially flat bottomed. However, for many purposes, this kidney-shaped inlet recess or cavity can be of a dished or rounded contour providing a more streamlined passage of liquid.

Now carrying forward the feature which comprises the divisional subject matter initially shown in the original FIGURE 9 of the parent application referred to, it will be noted that FIGURE 5 of the present application is a substantial copy of that earlier diagrammatic view, and shows very clearly the clipped or triangulated shape of the principal valve discs 33 and 43. In this diagram, the disc is clipped along the three chordal lines 50 to leave the projecting arcuate extensions 51 which cover partially or wholly the outlet orifices which they are intended to control, whether of the paired tubular conduits 18 or of the single passageway 25 shown. The rebound control feature is shown somewhat more completely in the top view in FIGURE 1 of the drawings where the arcuate apex portions 51 of the disc 43 overlie the outlet orifices of the passageway 25 but permit a crescent-shaped permanently open passageway 55.

In the same view may be clearly seen the way by which the chordal straight edge 50 affords a wider inlet opening for the compression passageway systems 16, the overlap of the disc 43 upon the inlet cavity 20 being much less than if the disc were completely circular.

Of course, the additional and probably most important advantage of this arrangement resides in the fact that when the three lips or apex portions 51 flex under the influence of fluid issuing from passageway 25 the lines of flexure of these portions, suggested at "a" in FIGURE 5, cannot intersect within the area of the disc and thus convert the progressive cylindrical flexing of the valves into a conical or snap flexure. It will be clearly seen that these lines "a" indicating the beginnings of flexure would only intersect at the projected points "b."

It can be similarly understood from the bottom plan view of FIGURE 2 how the three arcuate apex portions 51' of the bottom controlling disc 33 cover the twin outlet openings of the passageways 18 comprising the compression passageway system. Also, the flattened clipped edges 50' of the disc 33 afford the same advantages in connection with the inlet cavities 27 as described in connection with the upper system of valving.

In FIGURE 4 of the drawings, there is illustrated in bottom plan view a modified form of valving which has been applied to a shock absorber of considerably greater cylinder and piston diameters than the one illustrated in FIGURES 1, 2 and 3; and it happens that in this particular case the compression valve disc 33 is so arranged with respect to the orifices of the passageways 18 that crescent-shaped permanently open passageways 55' are left exposed.

As mentioned above, there are certain added advantages in the present novel valve construction when applied to a shock absorber piston of small diameter, in that control valve discs of quite ample diameter may be employed, provided they are clipped or triangulated as illustrated.

It is understood that various changes and modifications may be made in the embodiments illustrated and described herein without departing from the scope of the invention as determined by the subjoined claims.

Having thus described the invention, what is claimed as new and desired to be secured by Letters Patent is:

1. In a direct-acting telescoping fluid-damped cylinder-and-piston shock absorber for operative connection between two members to cushion the relative movements of said members toward and away from each other, the combination of: a cylindrical casing containing a damping liquid, a piston disposed in said casing for reciprocation within the body of damping liquid upon the occurrence of relative movements of the piston and the casing, the casing and the piston adapted to be connected with the respective members; a set of passageways extending through the piston in the longitudinal direction and opening directly through one face of the piston, through which passageways the liquid may pass from one side of the piston to the other during reciprocation of said piston in one direction, said set of passageways comprising three groups of passageways disposed 120° apart as at the apices of an equilateral triangle and each group consisting of at least one passageway; valving secured centrally to said face of said piston and comprising at least one thin flexible valve disc extending substantially flush with the said face of the piston and its marginal portions covering at least parts of the areas of the orifices of said passageways; said valve disc comprising a circular disc with three substantial segments removed along symmetrical chordal lines leaving a triangulated contour with three equally spaced blunt apex portions with arcuate ends overlying the said orifices; means for securing said valving to the face of the piston comprising a circular retaining washer of such diameter relative to that of the valve disc that three lines representing the radially innermost elements of substantial flexure of the discs and subtending the said apex portions, will not intersect within the area of the triangulated disc although possibly intersecting within the confines of the projected complete circle of an uncut disc; and thus the disc in operation will be flexed cylindrically along three marginal mutually exclusive areas thereby reducing the fatigue to which the discs are subjected during use and also equalizing and distributing the directional effect of any anisotropism of the material to which the discs are made, and without diminishing the structure of the radially inward and intermediate areas of the valve discs.

2. In a direct-acting telescoping fluid-damped cylinder-and-piston shock absorber for operative connection between two members to cushion the relative movements of said members toward and away from each other, the combination of: a cylindrical casing containing a damping liquid, a piston disposed in said casing for reciprocation within the body of damping liquid upon the occurrence of compression and extension movements, the casing and the piston adapted to be connected with the respective members; two sets of passageways extending through said piston in the longitudinal direction through which the fluid may pass from one side of the piston to the other during reciprocation thereof, and at least one thin flexible valve disc secured centrally to each end of the piston for controlling and regulating the flow of damping fluid through the passageways in the respective directions, one set of said passageways serving primarily to transmit fluid from the extension side of the piston to the compression side thereof upon the occurrence of extension movement, one of said valve discs overlying and controlling the outlet orifices of said extension passageways at the compression face of the piston, and the other set of said passageways serving primarily to transmit fluid from the compression side of the piston to the extension side thereof upon the occurrence of compression movement, the other one of said valve discs overlying and controlling the outlet orifices of said other set of passageways at the extension face of the piston, each of said sets of passageways comprising three groups of passageways disposed 120° apart as at the apices of an equilateral triangle, and each group consisting of at least one passageway; each of said valve discs comprising a circular disc with three substantial segments removed along symmetrical chordal lines leaving a triangulated contour with three equally spaced blunt apex portions overlying the said outlet orifices of its controlled passageways, the edges of said disc along said three chordal lines overlying the respective inlet orifices of the other set of passageways, thus affording a considerably enlarged entrance to said inlet passageways; means for securing said valve discs to the respective faces of the piston comprising a circular retaining washer of such diameter relative to that of the valve disc that three lines representing the radially innermost lines of substantial flexure of the disc and subtending the said apex portions, will not intersect within the area of the triangulated disc although possibly intersecting within the confines of the projected complete circle of an uncut disc; and thus the disc in operation will be flexed cylindrically along three marginal mutually exclusive areas thereby reducing the fatigue to which the discs are subjected during use and also equalizing and distributing the directional effect of any anisotropism of the material to which the discs are made, and without diminishing the structure of the radially inward and intermediate areas of the valve discs.

References Cited in the file of this patent

UNITED STATES PATENTS

| | | |
|---|---|---|
| 1,834,590 | Holdsworth | Dec. 1, 1931 |
| 2,139,313 | Neubauer | Dec. 6, 1938 |
| 2,158,351 | Ames et al. | May 16, 1939 |
| 2,632,621 | Gamble | Mar. 24, 1953 |
| 2,673,625 | Crabtree | Mar. 30, 1954 |
| 2,676,676 | Strauss et al. | Apr. 27, 1954 |
| 2,748,898 | Carbon | June 5, 1956 |
| 3,003,594 | Carbon | Oct. 10, 1961 |

FOREIGN PATENTS

| | | |
|---|---|---|
| 323,389 | Italy | Sept. 5, 1934 |